US010364012B2

(12) United States Patent
Kimball et al.

(10) Patent No.: US 10,364,012 B2
(45) Date of Patent: Jul. 30, 2019

(54) EXHAUST SYSTEM FOR MARINE ENGINE

(71) Applicant: Indmar Products Company Inc., Millington, TN (US)

(72) Inventors: Kevin J. Kimball, Mount Dora, FL (US); Richard B. LaPorte, Fort Worth, TX (US); Richard J. Waggoner, Punta Gorda, FL (US)

(73) Assignee: Indmar Products Company Inc., Millington, TN (US)

( * ) Notice: Subject to any disclaimer, the term of this patent is extended or adjusted under 35 U.S.C. 154(b) by 262 days.

(21) Appl. No.: 15/443,064

(22) Filed: Feb. 27, 2017

(65) Prior Publication Data

US 2018/0245493 A1 Aug. 30, 2018

(51) Int. Cl.
*F01N 3/04* (2006.01)
*B63H 21/32* (2006.01)
*F01N 3/10* (2006.01)
*F01N 13/00* (2010.01)
*F01N 13/10* (2010.01)
*F01N 13/18* (2010.01)

(52) U.S. Cl.
CPC ............ *B63H 21/32* (2013.01); *F01N 3/046* (2013.01); *F01N 3/10* (2013.01); *F01N 13/004* (2013.01); *F01N 13/011* (2014.06); *F01N 13/107* (2013.01); *F01N 13/1805* (2013.01); *F01N 2260/024* (2013.01); *F01N 2590/02* (2013.01); *Y02T 10/20* (2013.01)

(58) Field of Classification Search
CPC ..... B63H 21/32; F01N 13/004; F01N 13/011; F01N 13/107; F01N 13/1805; F01N 3/046; F01N 3/10; F01N 2260/024; F01N 2590/02; Y02T 10/20
See application file for complete search history.

(56) References Cited

U.S. PATENT DOCUMENTS

| | | | | |
|---|---|---|---|---|
| 4,989,409 A | * | 2/1991 | Nakase | B63B 35/731 440/88 J |
| 6,432,287 B1 | * | 8/2002 | McMackin | G01K 13/02 123/697 |
| 6,461,208 B2 | * | 10/2002 | Suzuki | B63H 21/32 440/1 |
| 6,644,024 B1 | * | 11/2003 | Powers | F01N 3/04 60/298 |
| 7,803,026 B2 | | 9/2010 | McKinney | |
| 8,899,029 B1 | | 12/2014 | Dreyer et al. | |
| 9,518,495 B1 | | 12/2016 | Hilbert et al. | |
| 9,527,568 B1 | | 12/2016 | Belter et al. | |
| 9,534,526 B1 | | 1/2017 | Eichinger et al. | |

(Continued)

*Primary Examiner* — Laert Dounis
*Assistant Examiner* — Matthew T Largi
(74) *Attorney, Agent, or Firm* — Wood, Herron & Evans, LLP

(57) ABSTRACT

An exhaust system for a marine exhaust system includes two identical liquid-cooled exhaust manifolds. Each exhaust manifold has an outlet portion adapted to receive and retain a catalytic converter. Liquid cooled first and second risers are secured to the first and second exhaust manifolds. Bypass hoses enable fluid to pass from each exhaust manifold to its coupled riser. At the outlet of each riser, the cooling fluid and exhaust gas mix in a Y-pipe to create a combined flow. An exhaust outlet conduit downstream of the Y-pipe receives the combined flow and discharges the combined flow.

20 Claims, 7 Drawing Sheets

(56) References Cited

U.S. PATENT DOCUMENTS

| | | | | |
|---|---|---|---|---|
| 2008/0242164 A1* | 10/2008 | McKinney | ............ | B63H 21/32 |
| | | | | 440/89 R |
| 2009/0047849 A1* | 2/2009 | McKinney | ............ | B63H 21/32 |
| | | | | 440/89 C |
| 2010/0229540 A1* | 9/2010 | Waggoner | ............... | F01N 3/046 |
| | | | | 60/298 |
| 2016/0258335 A1* | 9/2016 | McKinney | ............ | F01N 13/004 |

* cited by examiner

EXHAUST SYSTEM FOR MARINE ENGINE

TECHNICAL FIELD

The present invention relates generally to exhaust systems for marine engines, and more particularly, to liquid-cooled marine engine exhaust systems.

BACKGROUND

Exhaust systems for marine engines generally include an exhaust manifold connected to the engine at each row (or "bank") of engine cylinders, and a corresponding exhaust conduit coupled to the exhaust manifold for directing exhaust gases from the manifold to an exhaust outlet. In conventional exhaust systems, the exhaust conduit includes a catalytic converter assembly having a catalyst that removes harmful emissions from the exhaust gases before being expelled through the exhaust outlet.

Exhaust systems can experience extremely high temperatures during use. For example, the core temperature of a catalytic converter in a conventional exhaust system can reach upwards of 1,000 degrees Fahrenheit (° F.) or more. For safety purposes, the U.S. Coast Guard requires that exterior surface temperatures of marine engine exhaust systems be maintained below 200° F. Accordingly, components of conventional marine engine exhaust systems, including the catalytic converter assemblies, are often liquid-cooled to ensure safe and compliant operating temperatures.

Referring to FIGS. 2 and 3, a prior art marine engine exhaust system 100 is shown, as disclosed in U.S. patent application Ser. No. 15/194,002 fully incorporated by reference herein. The prior art marine engine exhaust system 100 is used with a "V-8" engine, having two banks of four cylinders arranged in a known V-configuration. The prior art marine engine exhaust system 100 includes first and second exhaust manifolds 102, each being made of cast iron and being coupled to a bank of cylinders (not shown) of the engine via threaded bolts 104. As such, each of the exhaust manifolds 102 includes four exhaust inlet ports 106, each aligned with and receiving hot exhaust gases G expelled from a respective cylinder of the engine.

The prior art marine engine exhaust system 100 further includes first and second riser conduits 108, a Y-pipe 110, and an exhaust outlet conduit 112. Each of the first and second riser conduits 108 includes a lower riser section 114 made of aluminum defining an inlet end portion of the riser conduit 108 coupled to a respective cast iron exhaust manifold 102 with a clamp 116; a catalytic converter assembly 118 extending generally vertically from the lower riser section 114; and an upper riser section 120 extending upwardly from the catalytic converter assembly 118 and turning downwardly toward the Y-pipe 110 and defining an outlet end portion of the riser conduit 108.

The Y-pipe 110 includes first and second inlet legs 122 coupled to the first and second riser conduits 108 with clamped hoses 124, and an outlet leg 126 coupled to the exhaust outlet conduit 112 with a clamp 128.

As shown by directional arrows G in FIGS. 2 and 3, exhaust gases G are expelled from the engine into the exhaust manifolds 102. Each exhaust manifold 102 combines the incoming exhaust gases G into a stream, and directs the stream into the lower riser section 114 of the respective riser conduit 108. The exhaust gases G turn upwardly within the lower riser sections 114 and are directed through the catalytic converter assemblies 118, which reduce toxic pollutants in the exhaust gases G. Upon exiting the upper ends of the catalytic converter assemblies 118, the streams of exhaust gases G are directed through the upper riser sections 120 and then into the Y-pipe 110, which combines the two streams of exhaust gases G into a single stream. The unified stream of exhaust gases G is then directed through the outlet leg 126 of the Y-pipe 110 and into the exhaust outlet conduit 112, which directs the exhaust gases G through an exhaust system outlet 130.

As shown in FIG. 3, each lower riser section 114 includes an inner tube 134 and an outer tube 136 surrounding and spaced radially outward from the inner tube 134. Likewise, each upper riser section 120 includes an inner tube 138 and an outer tube 140 surrounding and spaced radially outward from the inner tube 138. Similarly, each catalytic converter assembly 118 includes an inner can 142 that houses a catalyst element 144 and an outer can 146 surrounding and spaced radially outward from the inner can 142. Each catalytic converter assembly 118 also includes inlet and outlet cone portions 148, 150 that taper from an intermediate portion 152 having an enlarged diameter for accommodating the catalyst element 144. Each catalyst element 144 removes toxic pollutants from the exhaust gases G, as described above.

The inner and outer tubes 134, 136 of each lower riser section 114, the inner and outer cans 142, 146 of the catalytic converter assembly 118, and the inner and outer tubes 138, 140 of the upper riser section 120 collectively define a riser liquid cooling passage 154, and may be arranged concentrically. As shown in FIGS. 2 and 3, the riser liquid cooling passages 154 communicate with manifold liquid cooling passage 156 (shown in exhaust manifold 102 in FIG. 3) via a cooling hose 160. Each cooling hose 160 is coupled at an inlet end to a manifold fitting 162 arranged on an outlet end portion of the respective exhaust manifold 102 (see, e.g., exhaust manifold 102 in FIG. 2) and coupled at an outlet end to a riser fitting 164 arranged on an inlet end portion on the lower riser section 114 of the respective riser conduit 108 (see, e.g., riser conduit 108 in FIG. 2).

As shown by directional arrows L in FIGS. 2 and 3, cooling liquid L is directed into the cooling inlets 166 from an external source (not shown) and flows through the manifold liquid cooling passages 156 in a direction parallel to a flow of the exhaust gases G, without contacting the exhaust gases G. The cooling liquid L then flows through the cooling hoses 160 and into the riser liquid cooling passages 154 of the riser conduits 108. In each riser liquid cooling passage 154, the cooling liquid L flows through the lower riser section 114, upwardly through the catalytic converter assembly 118, and into the upper riser section 120. While in the riser liquid cooling passage 154, the cooling liquid L flows parallel to the exhaust gases G but is separated from the exhaust gases G by the inner tubes 134, 138 and the inner can 142. The cooling liquid L then enters into the Y-pipe 110 where it is combined with the exhaust gases G, as indicated by overlapping arrows G, L in FIG. 2. The combined flows of exhaust gases G and cooling liquid L pass downwardly through the outlet leg 126 of the Y-pipe 110 and into the outlet conduit 112, to be ejected together through the exhaust system outlet 130.

One disadvantage of the prior art marine engine exhaust system 100 is the number of pieces required. The greater number of joints or connections between parts, the greater the likelihood of a leak. The present invention reduces the number of parts or pieces, thereby reducing the number of joints or connections between parts. An additional benefit of the present invention is a reduction in the number of clamps required in the exhaust system. Thereby, the present invention reduces the chances of a leak at the location of one joints joined by clamps.

An additional disadvantage of the known exhaust system 100 shown in FIGS. 2 and 3 is the weight of the cast iron exhaust manifolds 102. The cast iron outlet flanges 146 of exhaust manifolds 102 contact the aluminum riser inlet flanges 144 and are maintained in such a position with clamps 116. Due to the high temperatures to which such flanges are subject, these flanges may move over time and potentially damage the clamps 116 and/or flanges themselves due to the different materials of the flanges 146, 144.

Accordingly, there is a need for improvements to known marine engine exhaust systems to address these and other shortcomings.

SUMMARY

According to an exemplary embodiment of the invention, an exhaust system for a marine exhaust system includes first and second exhaust manifolds. Each of the first and second exhaust manifolds comprises a first portion adapted to be secured to an engine, an elbow portion and a second portion adapted to receive and retain a catalytic converter. Each of the exhaust manifolds has an inner member and an outer member so as to define a manifold liquid cooling passage between the inner and outer members of the exhaust manifold. A catalytic converter is located inside the second portion of each of the first and second exhaust manifolds.

The exhaust system for a marine exhaust system further comprises first and second risers. Each of the first and second risers comprises an inlet portion secured to an outlet end of one of the first and second exhaust manifolds, respectively, and a turn portion. Each of the first and second risers further comprises an inner tube that directs exhaust gases away from one of the exhaust manifolds and an outer tube surrounding the inner tube so as to define a riser liquid cooling passage between the inner and outer tubes of the riser. The exhaust system further comprises a Y-pipe having first and second inlet legs and an outlet leg. Each of the inlet legs of the Y-pipe is coupled to one of the first and second risers. The exhaust system further comprises an exhaust outlet conduit, the outlet leg of the Y-pipe being coupled to the exhaust outlet conduit.

Cooling liquid is introduced into the manifold liquid cooling passage of each of the first and second exhaust manifolds via a cooling inlet, passes through the manifold liquid cooling passage of each of the first and second exhaust manifolds, enters the riser liquid cooling passage of each of the risers via a hose extending between a manifold fitting and a riser fitting, passes through each of the riser liquid cooling passages and enters the inlet legs of the Y-pipe in which the cooling liquid is mixed with the exhaust gases.

According to another exemplary embodiment of the invention, the exhaust system for a marine engine comprises first and second exhaust manifolds. Each of the first and second exhaust manifolds comprises an inlet portion adapted to be secured to an engine, an elbow portion and a generally vertically oriented outlet portion adapted to receive and retain a catalytic converter. Each of the exhaust manifolds has an inner member and an outer member so as to define a manifold liquid cooling passage between the inner and outer members of the exhaust manifold. The exhaust system further comprises a catalytic converter located inside the inner member of each of the first and second exhaust manifolds.

The exhaust system further comprises first and second risers secured to the first and second exhaust manifolds, respectively. Each of the first and second risers comprises an inner tube that directs exhaust gases downstream from the exhaust manifold and an outer tube surrounding the inner tube so as to define a riser liquid cooling passage between the inner and outer tubes of the riser. The exhaust system further comprises a Y-pipe having first and second inlet legs and an outlet leg, the inlet legs of the Y-pipe being coupled to the first and second risers respectively. The exhaust system further comprises an exhaust outlet conduit, the outlet leg of the Y-pipe being coupled to the exhaust outlet conduit. Cooling liquid passes through the manifold liquid cooling passage of each of the first and second exhaust manifolds, enters the riser liquid cooling passage of each of the risers via a hose, passes through the riser liquid cooling passage and exits the riser liquid cooling passage into the Y-pipe in which the cooling liquid mixes with the exhaust gases.

According to another exemplary embodiment of the invention, the exhaust system for a marine engine comprises first and second exhaust manifolds. Each of the first and second exhaust manifolds comprises a unitary member having an inlet portion adapted to be secured to an engine, an elbow portion and an outlet portion adapted to receive and retain a catalytic converter. Each of the exhaust manifolds has an inner member and an outer member so as to define a manifold liquid cooling passage between the inner and outer members of the exhaust manifold. The exhaust system further comprises a catalytic converter located inside the inner member of each of the first and second exhaust manifolds.

The exhaust system further comprises first and second risers secured to the first and second exhaust manifolds, respectively. Each of the first and second risers comprises an inner tube that directs exhaust gases downstream from the exhaust manifold and an outer tube surrounding the inner tube so as to define a riser liquid cooling passage between the inner and outer tubes of the riser. The exhaust system further comprises a Y-pipe having first and second inlet legs and an outlet leg, the inlet legs of the Y-pipe being coupled to the first and second risers respectively. The exhaust system further comprises an exhaust outlet conduit, the outlet leg of the Y-pipe being coupled to the exhaust outlet conduit. Cooling liquid passes through the manifold liquid cooling passage of each of the first and second exhaust manifolds, enters the riser liquid cooling passage of each of the risers via a hose extending between a manifold fitting and a riser fitting, passes through the riser liquid cooling passage and exits the riser liquid cooling passage into the Y-pipe in which the cooling liquid mixes with the exhaust gases.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, serve to explain the embodiments of the invention.

DETAILED DESCRIPTION

Figure 1:
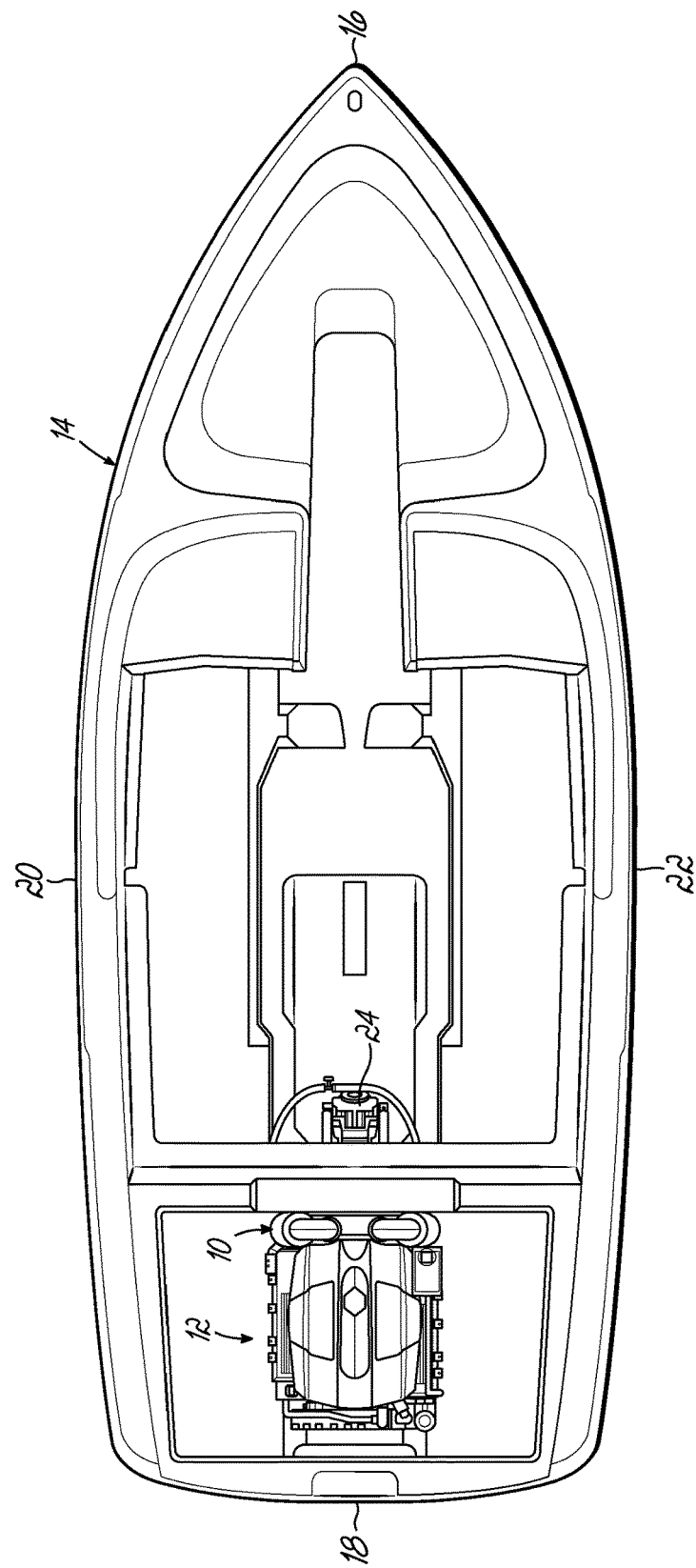
FIG. 1 is a top view of a motorboat including an inboard engine and an exhaust system in accordance with the present invention coupled to the engine.
Figure 2:
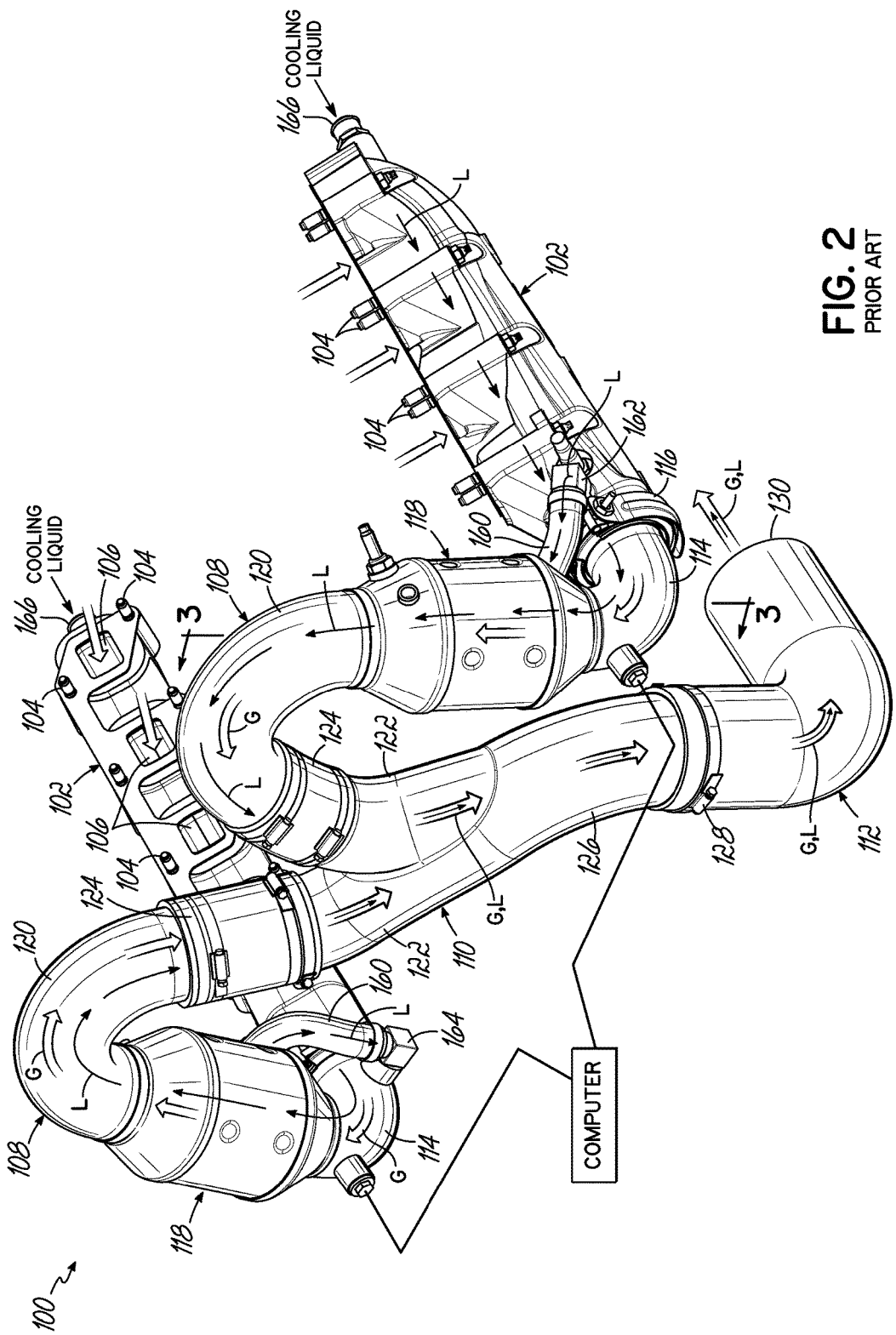
FIG. 2 is a perspective view of a known marine engine exhaust system.
Figure 3:
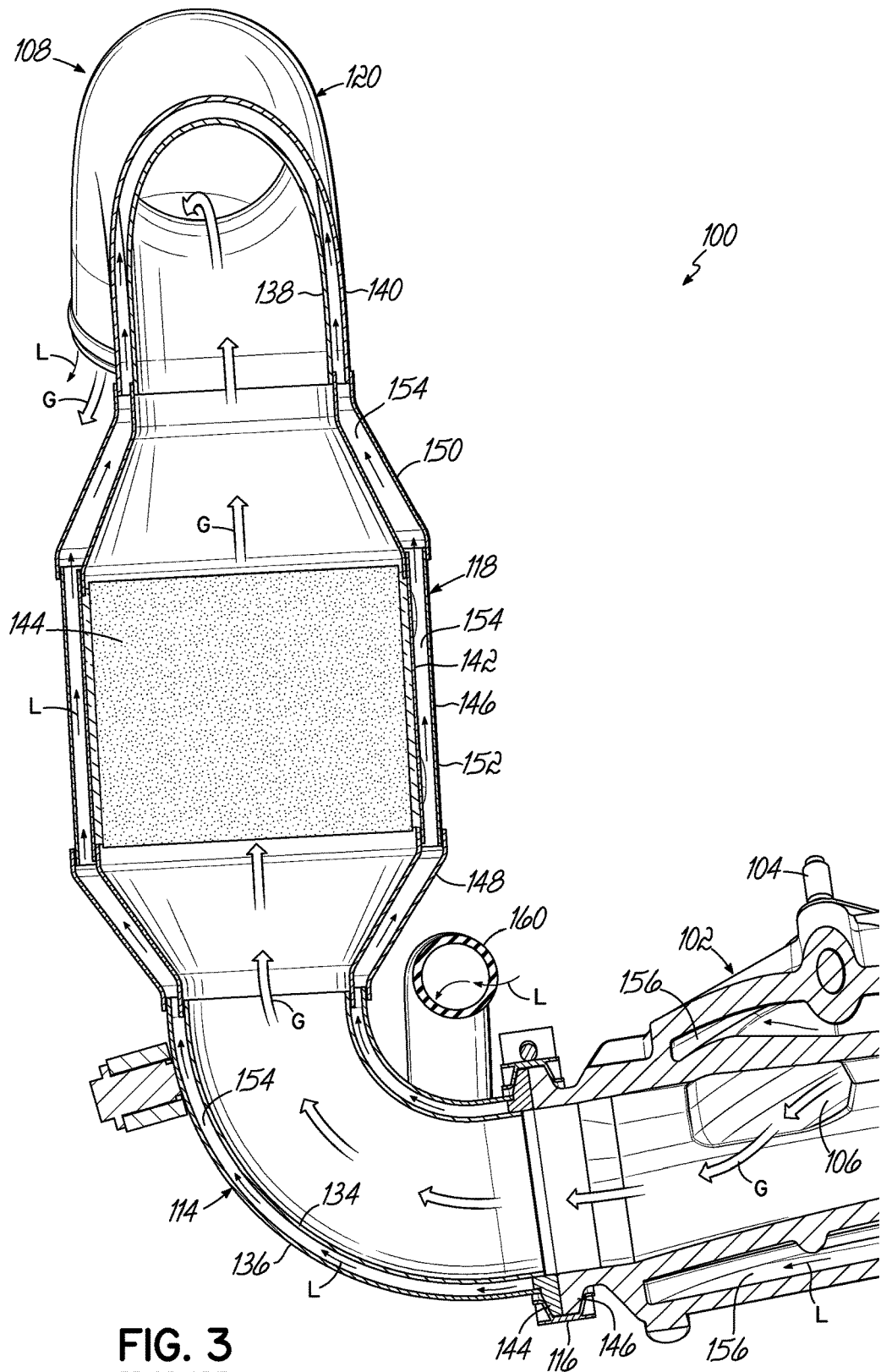
FIG. 3 is a side cross-sectional view taken along line 3-3 of FIG. 2.

Referring to FIG. 1, an exhaust system 10 according to an exemplary embodiment of the invention is shown mounted to a marine engine 12 within a motorboat 14. The motorboat 14 includes a bow 16, a stern 18, a port side 20, and a starboard side 22. The engine 12 is shown mounted in an "inboard" configuration and is coupled to a V-drive transmission 24 that drives a propeller shaft and propeller (not shown) to rotate, which propels the motorboat 14 through the water.

Figures 4, 4A:
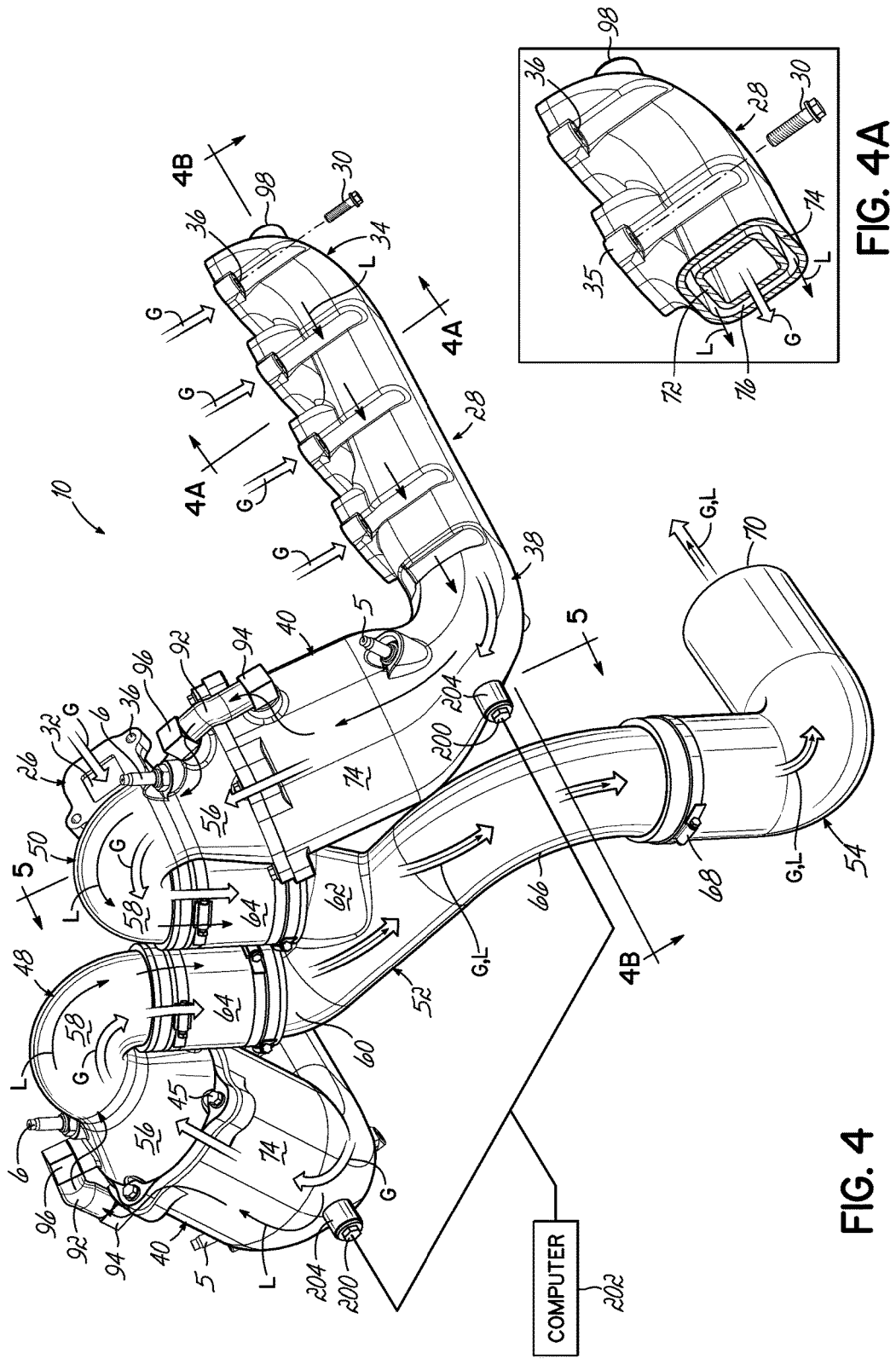
FIG. 4 is a perspective view of a marine engine exhaust system according to an exemplary embodiment of the invention.
FIG. 4A is side cross-sectional view taken along line 4A-4A of FIG. 4.
Figure 4B:
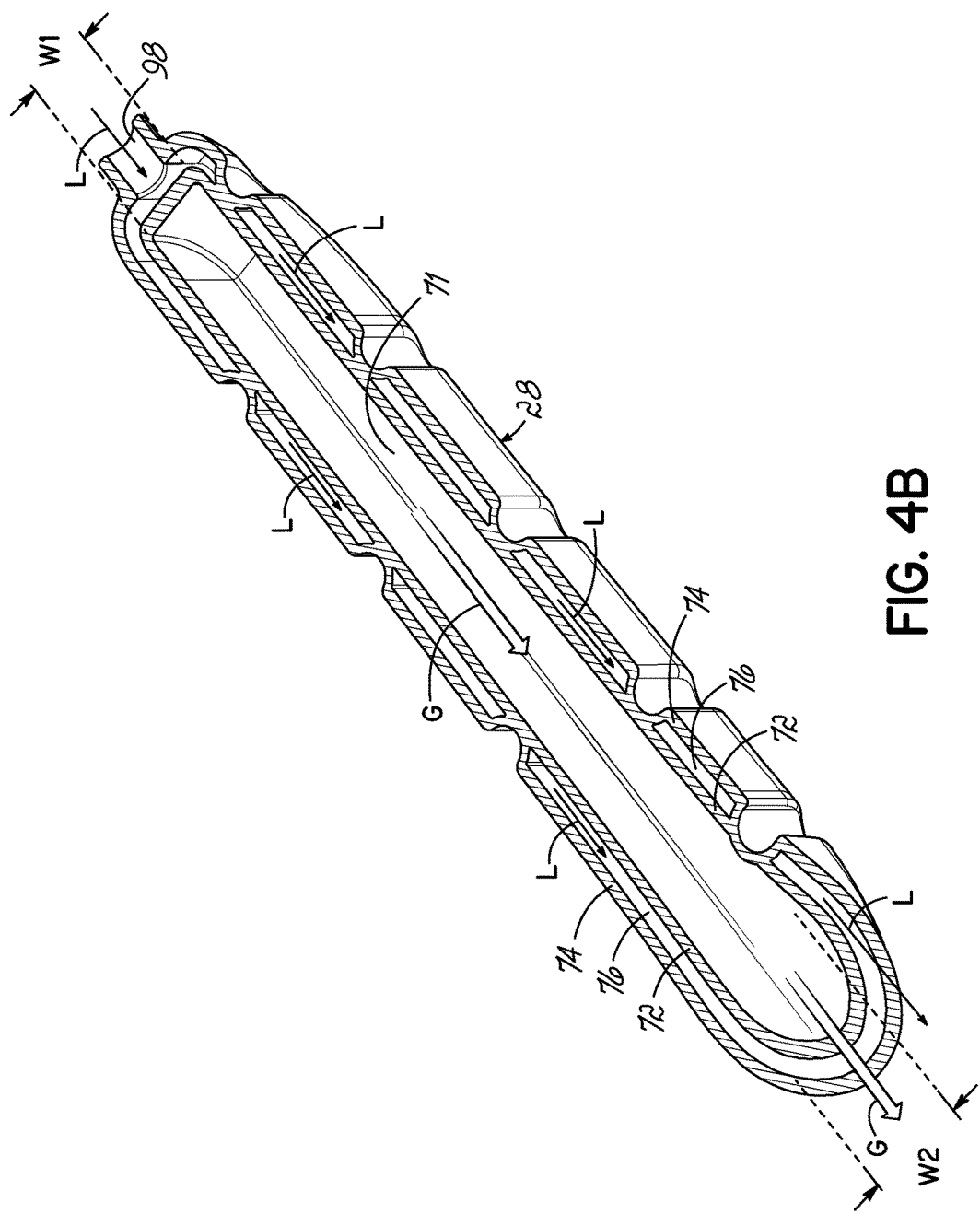
FIG. 4B is side cross-sectional view taken along line 4B-4B of FIG. 4.

Referring to FIG. 4, the exemplary exhaust system 10 is shown in greater detail, with the engine 12 being hidden from view. The exhaust system 10 generally includes a first exhaust manifold 26 that couples to a first bank of cylinders (not shown) of the engine 12 and a second exhaust manifold 28 that couples to a second bank of cylinders (not shown) of the engine 12 via threaded bolts 30. The engine 12 of FIG. 1 is shown in the form of a "V-8" engine, having two banks of four cylinders arranged in a known V-configuration. As such, each of the exhaust manifolds 26, 28 includes four exhaust inlet ports 32, each aligned with and receiving hot exhaust gases G expelled from a respective cylinder of the engine 12. In alternative embodiments, the exhaust manifolds 26, 28, as well as other components of the exemplary exhaust systems disclosed herein, may be modified as desired to accommodate marine engines 12 having various alternative quantities and configurations of cylinders.

Each of the exhaust manifolds 26, 28 is a unitary member, preferably made of cast aluminum. Each of the exhaust manifolds 26, 28 has a first or inlet portion 34 which is generally horizontally oriented and has a plurality of extensions 35, each extension 35 having an opening 36 through which one of the threaded bolts 30 passes to secure the exhaust manifold to the engine 12.

As shown in FIG. 4A, the width of the gas chamber 71 of the inlet portion 34 of each of the exhaust manifolds 26, 28 inside the inner member 72 described below increases as the gas chamber 71 extends downstream in the direction of flow of the exhaust gases G. This size increase helps keep the flow of exhaust gases G relatively constant as additional gases are introduced from more cylinders in a downstream direction prior to the elbow portion 38 of the inlet portion 34 of each of the exhaust manifolds 26, 28.

Downstream of the inlet portion 34 of each exhaust manifold 26, 28 is a elbow portion 38 which turns the flow of exhaust gases G and cooling fluid L from a first horizontally oriented direction shown by arrows G, L to a second upwardly directly direction shown by arrows G, L. In other words, the elbow portion 38 of each exhaust manifold 26, 28 turns the flow of exhaust gases G and cooling fluid L approximately ninety degrees from a generally horizontal flow to a generally vertical upwardly directed flow.

Figure 5:
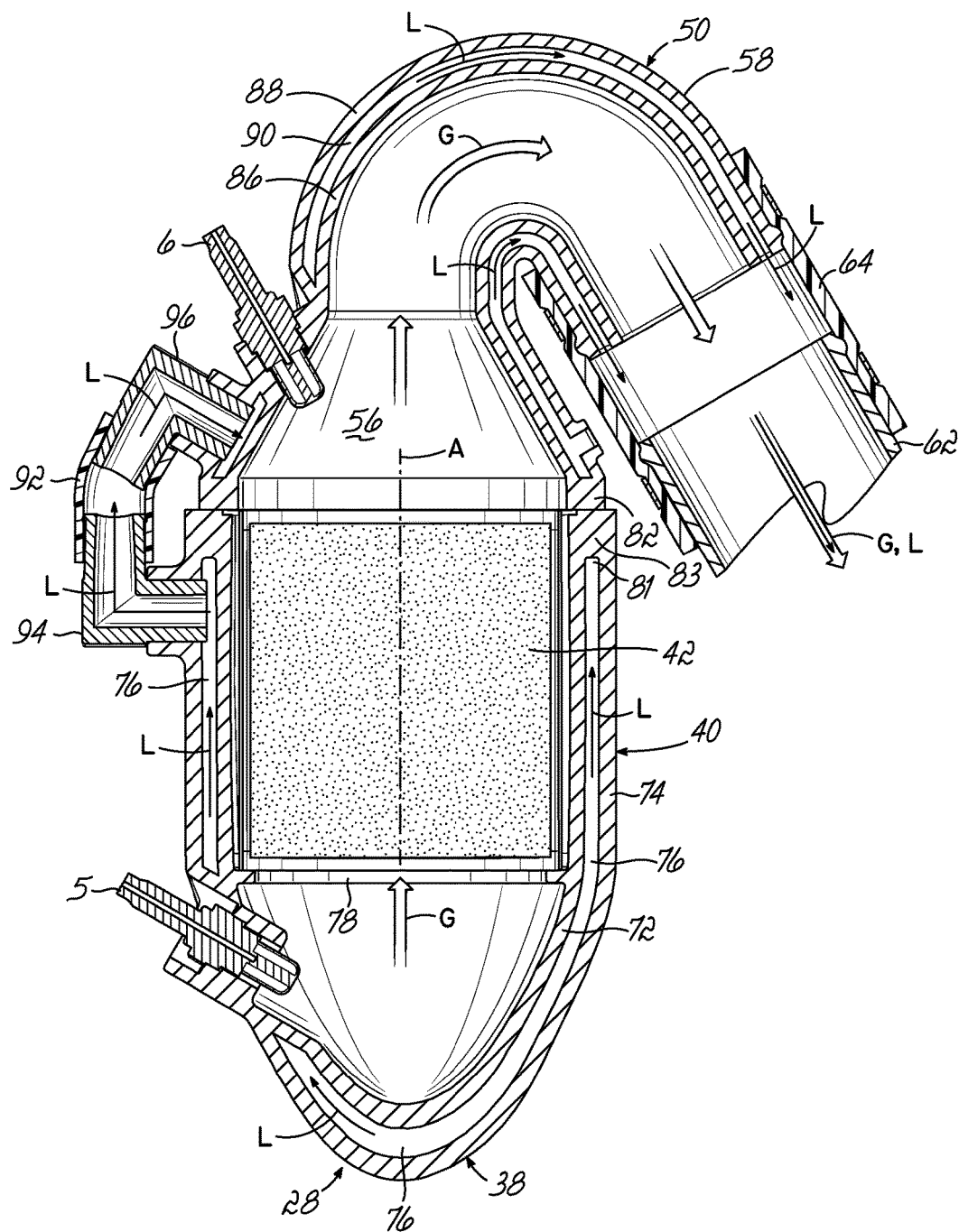
FIG. 5 is side cross-sectional view taken along line 5-5 of FIG. 4.
Figure 6:
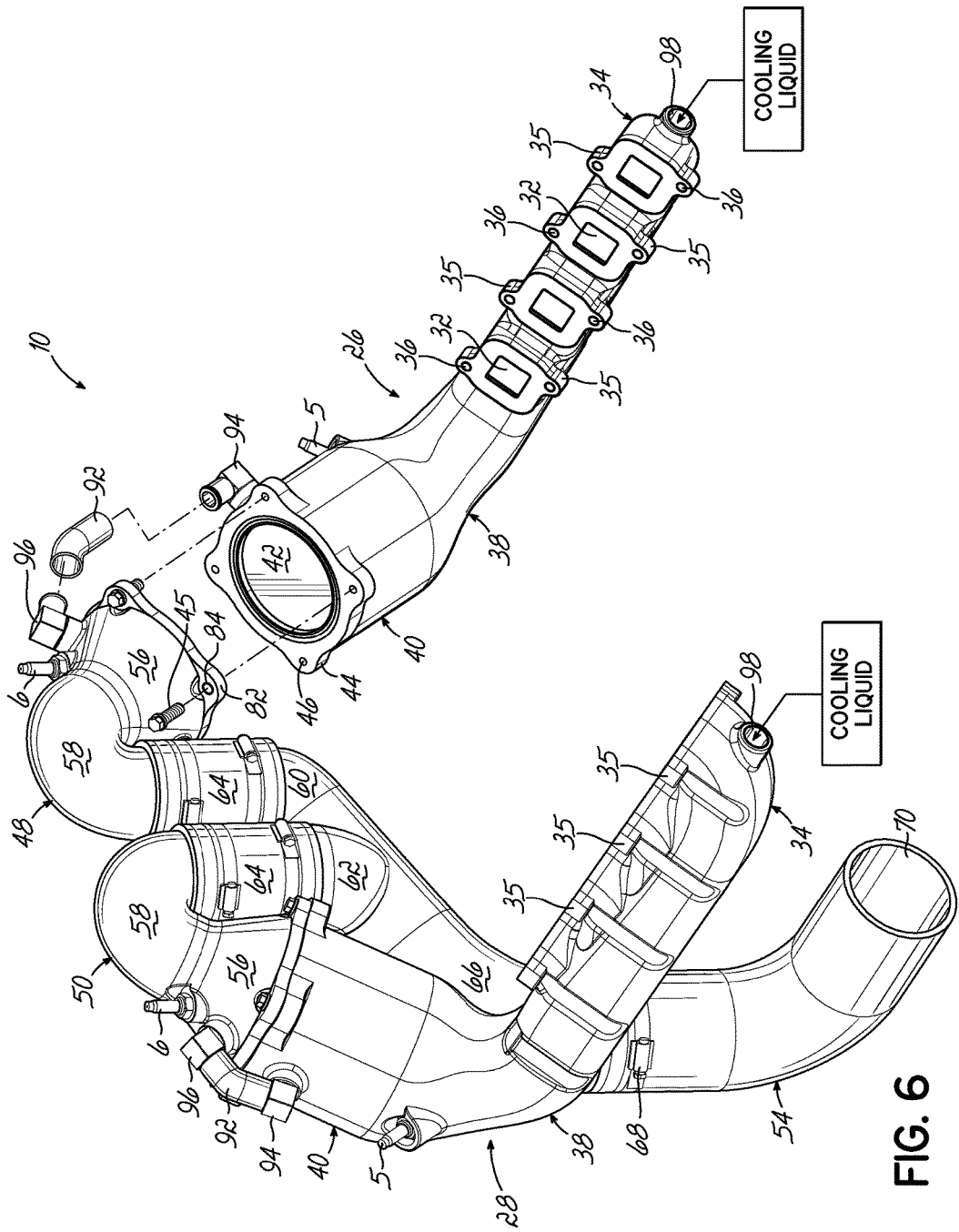
FIG. 6 is a partially disassembled view of the marine engine exhaust system of FIG. 4.

Downstream of the elbow portion 38 of each exhaust manifold 26, 28 is an outlet portion 40 which is generally vertically oriented and retains a catalytic converter 42. Each catalytic converter 42 is generally cylindrical, having a round cross-section and a central axis A, as shown in FIG. 5. As best shown in FIGS. 4 and 6, the axes A of the two catalytic converters 42 extend towards each other in an upward direction and away from each other in a downward direction; in other words the axes A of the two catalytic converters 42 are not parallel and not exactly vertical. The same is true of the second or outlet portions 40 of the exhaust manifold 26, 28.

As best shown in FIG. 6, the downstream or upper end of each of exhaust manifold 26, 28 has a mounting flange 44 having a plurality of openings 46 sized to allow fasteners 45 (only two per side being shown in FIG. 6) to secure the exhaust manifold 26, 28 to a riser conduit 48, 50. Although the fasteners 45 are illustrated being threaded bolts, they may be any conventional fasteners. Although four fasteners 45 are illustrated per side, any number of conventional fasteners may be used.

The exhaust system 10 further includes first and second risers 48, 50, a Y-pipe 52, and a generally L-shaped exhaust outlet conduit 54. Each of the first and second risers 48, 50 includes an inlet cone section 56 defining an inlet end portion of the riser 48, 50 coupled to a respective exhaust manifold 26, 28 with four bolts 45. Each of the first and second risers 48, 50 further comprises a turn section 58 extending generally upwardly from the lower cone section 56; and turning downwardly toward the Y-pipe 52 and defining an outlet end portion of the riser 48, 50.

The Y-pipe 52 includes first and second inlet legs 60, 62 coupled to the first and second risers 48, 50, respectively, with clamped hoses 64, and an outlet leg 66 coupled to the exhaust outlet conduit 54 with a clamp 68. More specifically, the first inlet leg 60 couples to the outlet end of the first riser 48, and the second inlet leg 62 couples to the outlet end of the second riser 50.

As shown by directional arrows G in FIGS. 4 and 4A, exhaust gases G are expelled from the engine 12 into the exhaust manifolds 26, 28. Each exhaust manifold 26, 28 combines the incoming exhaust gases G into a stream, and directs the stream into the inlet portion 34 of the respective exhaust manifold 26, 28. The exhaust gases G turn upwardly within the elbow portion 38 of each exhaust manifold 26, 28 and are directed through the catalytic converter 42 inside the outlet portion 40 of the exhaust manifold 26, 28. Each catalytic converter 42 reduces toxic pollutants in the exhaust gases G. Upon exiting the upper ends of the exhaust manifold 26, 28, the streams of exhaust gases G are directed through the first and second risers 48, 50 and then into the Y-pipe 52, which combines the two streams of exhaust gases G into a single stream. The unified stream of exhaust gases G is then directed through the outlet leg 66 of the Y-pipe 52 and into the exhaust outlet conduit 54, which directs the exhaust gases G through an exhaust system outlet 70.

The physical configuration of the exhaust outlet conduit 54 as shown in FIG. 4 is merely exemplary. The exhaust outlet conduit 54 may extend for any desired length and with any configuration suitable for directing the exhaust gases G to an external environment. For example, an outlet end of the exhaust outlet conduit 54 may extend externally through a transom or a side of the hull of the motorboat 14, and may include an exhaust tip (not shown) of various types known in the art, for example.

The outer surfaces of the exhaust system 10 are maintained at safe operating temperatures, for example below 200° F., via liquid cooling. More specifically, the exhaust system 10 includes internal cooling passages (referred to collectively as a cooling "jacket"), described below, that circulate cooling liquid L through the components of the exhaust system 10 during operation. In exemplary embodiments, the cooling liquid L may be in the form of water, such as "raw" water drawn from the body of water (e.g., lake or ocean) in which the motorboat 14 is operating. Those skilled in the art will appreciate that the cooling liquid L may take various other forms, such as a synthetic coolant mixture, for example.

Referring to FIG. 5, additional features of the second exhaust manifold 28 and the second riser 50 are shown. One such feature is the presence of a first oxygen sensor 5 extending through the elbow portion 38 of the second exhaust manifold 28 and a second oxygen sensor 6 extending through the inlet cone section 56 of the second riser 50. The oxygen sensors 5, 6 acquire data regarding the exhaust gases upstream and downstream of the catalytic converter 42. The data may be used to monitor the speed of the engine 12 to ensure the catalytic converters 42 are functioning properly. While not shown or described in detail, it will be understood that the first exhaust manifold 26 and the first riser 48 are formed with similar structural features.

As shown in FIGS. 4A and 5, the second exhaust manifold 28 includes an inner member 72 and an outer member 74 surrounding and spaced outward from the inner member 72 defining a manifold liquid cooling passage 76 therebetween. As shown in FIG. 5, in the outlet section 40 of the second exhaust manifold 28, the outer member 74 surrounds and is spaced radially outward from the inner member 72. As shown in FIG. 5, manifold liquid cooling passage 76 stops at location 81 prior to the upper end 83 of outlet section 40 of the second exhaust manifold 28. The same is true in the first exhaust manifold 26. The flow of cooling liquid L through the manifold liquid cooling passage 76 extends through the manifold fitting 94, then through the cooling hose 92 and through the riser fitting 96 before the cooling fluid flows into the riser liquid cooling passage 90. Such configuration helps keep the catalytic converter or brick 42 at a higher temperature than prior art configurations, thereby increasing the efficiency of each of the two catalytic converters 42 and allowing smaller size catalytic converters 42 to be used in the exhaust system 10. Smaller catalytic converters 42 save valuable space in the exhaust system 10.

As shown in FIG. 5, a horizontally oriented shelf 78 is located inside the inner member 72, the catalyst element 42 resting on the shelf 78 in each exhaust manifold 26, 28. The catalyst element or catalytic converter 42 removes toxic pollutants from the exhaust gases G, as described above.

As best shown in FIGS. 5 and 6, each of the risers 48, 50 includes an inlet cone section 56 that tapers as it extends upwardly from a lower flange 82 having four openings 84. The inlet cone section 56 of each of the risers 48, 50 has an enlarged diameter to match the diameter of the outlet portion 40 of the exhaust manifold 26, 28. In other words, the four openings 84 in the inlet flange 82 of the each of the risers 48, 50 must align with the four openings 46 in the outlet flange 44 of each of the respective exhaust manifolds 26, 28 so that fasteners or bolts 45 may secure first riser 48 to first exhaust manifold 26 and secure second riser 50 to second exhaust manifold 28, respectively.

As best shown in FIGS. 5 and 6, the turn section 58 of each of the risers 48, 50 downstream of the inlet cone section 56 includes inner and outer tubes 86, 88 which define a riser liquid cooling passage 90, and may be arranged concentrically. As shown in FIG. 5, the riser liquid cooling passages 90 communicate with manifold liquid cooling passages 76 (one being shown in exhaust manifold 28 in FIG. 5) via a cooling hose 92. Each cooling hose 92 is coupled at an inlet end to a manifold fitting 94 arranged on an outlet end portion of the respective exhaust manifold 26, 28 (see, e.g., exhaust manifold 28 in FIG. 5) and coupled at an outlet end to a riser fitting 96 arranged on an inlet end portion of the inlet cone section 56 of the respective riser 48, 50 (see, e.g., riser 50 in FIG. 5).

As shown by directional arrows L in FIGS. 4 and 5, cooling liquid L is directed into the cooling inlets 98 from an external source (not shown) and flows through the manifold liquid cooling passages 76 in a direction parallel to a flow of the exhaust gases G, without contacting the exhaust gases G. The cooling liquid L then flows through the cooling hoses 92 and into the riser liquid cooling passages 90 of the risers 48, 50. In each riser liquid cooling passage 90, the cooling liquid L flows upwardly through the inlet cone section 56 and into the turn section 58. While in the riser liquid cooling passage 90, the cooling liquid L flows parallel to the exhaust gases G but is separated from the exhaust gases G by the inner tube 86. The cooling liquid L then enters into the Y-pipe 52 where it is combined with the exhaust gases G, as indicated by overlapping arrows G, L in FIG. 4. The combined flows of exhaust gases G and cooling liquid L pass downwardly through the outlet leg 66 of the Y-pipe 52 and into the outlet conduit 54, to be ejected together through the exhaust system outlet 70.

As shown in FIG. 5, the elbow portion 38 of each respective exhaust manifold 26, 28 curves upwardly from an inlet portion 34 that is oriented generally horizontally, toward an outlet end portion 40 that is oriented generally vertically and houses one of the catalytic converters 42. For example, in exemplary embodiments the outlet end portion 40 of each exhaust manifold 26, 28 may extend along an axis that is approximately 15 degrees or less from perfect vertical. In this regard, the outlet end portion 40 of each exhaust manifold 26, 28 may be angled toward the inlet portion of the respective exhaust manifold 26, 28, for example. This generally vertical orientation of the outlet end portion 40 of each exhaust manifold 26, 28 facilitates draining of cooling liquid L from the manifold liquid cooling passages 76, through drainage ports (not shown) provided on the exhaust manifolds 26, 28, when the engine 12 is turned off. Residual cooling liquid L in the manifold liquid cooling passages 76 drains downwardly in a direction opposite of the arrows L shown in FIGS. 4 and 5.

With continued reference to FIG. 4, the exhaust system 10 may further include a pair of skin temperature sensors 200 that communicate with an onboard computer 202 for monitoring surface temperatures of the outlet end portions 40 of exhaust manifolds 26, 28. Each outlet end portion 40 of each exhaust manifold 26, 28 may include a boss 204 that supports the respective temperature sensor 200 in contacting relation with an outer surface of the outlet end portion 40 of each exhaust manifold 26, 28. As shown, each boss 204 may be arranged on the outer member 74 of the outlet end portion 40 of each exhaust manifold 26, 28. More specifically, the boss 204 may be arranged on a bow-facing side of outlet end portion 40 of each exhaust manifold 26, 28, which extends generally vertically. In one embodiment, the boss 204 may be arranged approximately two inches or less from the inlet cone section 56 of the riser 48, 50. Each boss 204 may be formed with a threaded bore that threadedly engages a distal end (not shown) of the temperature sensor 200 so that the distal end (not shown) is held in contact with the outer surface of the outer member 76 of the outlet end portion 40 of each exhaust manifold 26, 28.

Those skilled in the art will appreciate that the elbow portion 38 of each exhaust manifold 26, 28 is generally hotter than downstream components of the riser 48, 50, such as the turn section 58, due to being located in closer proximity to the exhaust manifold 26, 28. Accordingly, a surface temperature reading taken at a location along the elbow portion 38 of each exhaust manifold 26, 28 is generally representative of one of the hottest surface temperatures exhibited by the riser 48, 50 during operation of the engine 12. Nevertheless, in alternative embodiments the bosses 204 and temperature sensors 200 may be mounted to the risers 48, 50 at various other locations along the length of the risers 48, 50, including at downstream locations such as the on the turn sections 58, for example. Additionally, various alternative quantities of temperature sensors 200 may be used as desired.

Each temperature sensor 200 detects a surface temperature of its respective riser 48, 50, and sends a signal to the computer 202 containing information regarding the detected temperature. Communication between the temperature sensors 200 and the computer 202 may be performed via wires directly connecting the temperature sensors 200 to the computer 202, or alternatively via a wireless network, for example. In response to receiving the signals from the temperature sensors 200, the computer 202 determines whether each riser 48, 50 is receiving an adequate flow of cooling liquid L through its riser liquid cooling passage 90. More specifically, the computer 202 may compare each of the detected temperatures to one or more pre-determined threshold temperatures, and then take additional pre-determined action as appropriate.

In an exemplary embodiment, the computer 202 may determine whether each of the detected temperatures is less than or equal to a base threshold temperature of approximately 160° F. If the detected temperatures satisfy this condition, the computer 202 may conclude that the risers 48, 50 are receiving an adequate flow of cooling liquid L. If the detected temperatures do not satisfy this condition, the computer 202 may take further action. More specifically, if one or both of the detected temperatures is between the base threshold temperature and an elevated threshold temperature, such as 190° F. for example, the computer 202 may log a warning condition and provide a warning message to the user, for example by illuminating one or more indicator lights (not shown) or by displaying a message on a digital display (not shown). If one or both of the detected temperatures is greater than the elevated threshold temperature, the computer 202 may instruct an engine control module (not shown) to decrease rpm's of the engine 12 by a predetermined amount, or according to a programmed algorithm, for example. In this manner, the outer surface temperatures of the exhaust system 10 may be maintained within desirable ranges.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A marine engine exhaust system comprising:

first and second exhaust manifolds, each of said first and second exhaust manifolds being a unitary member and comprising a generally horizontally oriented first portion adapted to be secured to an engine, an elbow portion downstream of the first portion and a generally vertically oriented second portion downstream of the elbow portion and above the elbow portion, the generally vertically oriented second portion of the first exhaust manifold being adapted to receive and retain a first catalytic converter having a central axis and the generally vertically oriented second portion of the second exhaust manifold being adapted to receive and retain a second catalytic converter having a central axis, each of said first and second exhaust manifolds having an inner member and an outer member so as to define a manifold liquid cooling passage between the inner and outer members of the respective exhaust manifold, wherein the central axes of the first and second catalytic converters extend towards each other in an upward direction;

the first catalytic converter resting on a first shelf located inside the second portion of the first exhaust manifold and the second catalytic converter resting on a second shelf located inside the second portion of the second exhaust manifold;

first and second risers, each of said first and second risers comprising an inlet portion and a turn portion, the inlet portion of the first riser being secured to an outlet end of the first exhaust manifold and the inlet portion of the second riser being secured to an outlet end of the second exhaust manifold, each of the first and second risers comprising an inner tube and an outer tube surrounding the inner tube so as to define a riser liquid cooling passage between the inner and outer tubes of the respective riser, wherein the first riser and its respective inner tube directs exhaust gases away from the first manifold and the second riser and its respective inner tube directs exhaust gases away from the second manifold;

a Y-pipe having first and second inlet legs and an outlet leg, one of the first and second inlet legs of the Y-pipe being coupled to one of the first and second risers and the other of the first and second inlet lets of the Y-pipe being coupled to the other of the first and second risers; and an exhaust outlet conduit, the outlet leg of the Y-pipe being coupled to the exhaust outlet conduit, wherein cooling liquid is introduced into the manifold liquid cooling passage of each of the first and second exhaust manifolds via a cooling inlet, passes through the manifold liquid cooling passage of each of the first and second exhaust manifolds, enters the riser liquid cooling passage of each of the risers via a hose extending between a manifold fitting and a riser fitting, passes through each of the riser liquid cooling passages and enters the inlet legs of the Y-pipe in which the cooling liquid is mixed with the exhaust gases.

2. The exhaust system of claim 1, wherein the first and second inlet legs of the Y-pipe are coupled to the first and second risers respectively, with clamped hoses.

3. The exhaust system of claim 1, wherein the outlet leg of the Y-pipe is coupled to the exhaust outlet conduit with a clamp.

4. The exhaust system of claim 1, wherein the exhaust outlet conduit is generally L-shaped.

5. The exhaust system of claim 1, wherein the first portion of each of the first and second exhaust manifolds has a plurality of inlet ports for receiving exhaust gases.

6. The exhaust system of claim 1, wherein the second portion of each of the first and second exhaust manifolds is generally vertically oriented.

7. The exhaust system of claim 1, wherein an inlet end of the outer tube of the first riser extends radially inward toward the inner tube of the first riser and an inlet end of the outer tube of the second riser extends radially inward toward the inner tube of the second riser.

8. The exhaust system of claim 1, further comprising:
a first boss arranged on the outer member of each of the first exhaust manifold, the first boss configured to support a sensor for detecting a temperature of the outer member of the first riser.

9. The exhaust system of claim 8, wherein the boss is configured to support the sensor in contacting relation with the outer member.

10. The exhaust system of claim 8, wherein the boss is arranged between the first and second portions of the exhaust manifold.

11. An exhaust system for a marine engine comprising:
a first exhaust manifold comprising an inlet portion adapted to be secured to an engine, an elbow portion and an outlet portion adapted to receive and retain a first catalytic converter having a central axis, a second exhaust manifold having an inlet portion adapted to be secured to an engine, an elbow portion and an outlet portion adapted to receive and retain a second catalytic converter, each of said first and second exhaust manifolds having an inner member and an outer member so as to define a manifold liquid cooling passage between the inner and outer members of the exhaust manifold;
the first catalytic converter resting on a first shelf inside the inner member of the first exhaust manifold and the second catalytic converter resting on a second shelf located inside the inner member of the second exhaust manifold, the first shelf being generally perpendicular to the central axis of the first catalytic converter and the second shelf being generally perpendicular to the central axis of the first catalytic converter;
first and second risers secured to the first and second exhaust manifolds, respectively, each of the first and second risers comprising an inner tube that directs exhaust gases downstream from the exhaust manifold and an outer tube surrounding the inner tube so as to define a riser liquid cooling passage between the inner and outer tubes of the riser;
a Y-pipe having first and second inlet legs and an outlet leg, the first and second inlet legs of the Y-pipe being coupled to the first and second risers respectively; and
an exhaust outlet conduit, the outlet leg of the Y-pipe being coupled to the exhaust outlet conduit,
wherein cooling liquid passes through the manifold liquid cooling passage of each of the first and second exhaust manifolds, enters the riser liquid cooling passage of each of the first and second risers via a hose, passes through the riser liquid cooling passage and exits the riser liquid cooling passage into the Y-pipe in which the cooling liquid mixes with the exhaust gases.

12. The exhaust system of claim 11, wherein the cooling liquid is introduced into the manifold liquid cooling passage of each of the first and second exhaust manifolds via a cooling inlet.

13. The exhaust system of claim 11, wherein each of the hoses extends between a manifold fitting and a riser fitting.

14. The exhaust system of claim 11, wherein each of the first and second exhaust manifolds is bolted to one of the first and second risers, respectively.

15. The exhaust system of claim 11, wherein the first and second inlet legs of the Y-pipe are coupled to the first and second risers respectively, with clamped hoses.

16. An exhaust system for a marine engine comprising:
first and second exhaust manifolds, each of said first and second exhaust manifolds comprising a unitary member having an inlet portion adapted to be secured to an engine, an elbow portion and an outlet portion adapted to receive and retain a catalytic converter, each of said first and second exhaust manifolds having an inner member and an outer member so as to define a manifold liquid cooling passage between the inner and outer members of the exhaust manifold;
a catalytic converter located inside the outlet portion of each of the first and second exhaust manifolds;
first and second risers secured to the first and second exhaust manifolds, respectively, each of the first and second risers comprising an inner tube that directs exhaust gases downstream from the exhaust manifold and an outer tube surrounding the inner tube so as to define a riser liquid cooling passage between the inner and outer tubes of the riser;
a Y-pipe having first and second inlet legs and an outlet leg, the first and second inlet legs of the Y-pipe being coupled to the first and second risers; and
an exhaust outlet conduit, the outlet leg of the Y-pipe being coupled to the exhaust outlet conduit,
wherein cooling liquid passes through the manifold liquid cooling passage of each of the first and second exhaust manifolds, enters the riser liquid cooling passage of each of the first and second risers via a hose extending between a manifold fitting and a riser fitting, passes through the riser liquid cooling passage and exits the riser liquid cooling passage into the Y-pipe in which the cooling liquid mixes with the exhaust gases and wherein the elbow portion of each of the first and second exhaust manifolds turns the flow of exhaust gases and cooling fluid approximately ninety degrees from a generally horizontal flow to a generally vertical upwardly directed flow away from the engine.

17. The exhaust system of claim 16, wherein the outlet portion of each of the first and second exhaust manifolds is generally vertically oriented.

18. The exhaust system of claim 16, wherein each of the first and second risers has a cone-shaped inlet section.

19. The exhaust system of claim 16, further comprising oxygen sensors upstream and downstream of each of the catalytic converters.

20. The exhaust system of claim 16, wherein the first and second inlet legs of the Y-pipe are coupled to the first and second risers respectively, with clamped hoses.

* * * * *

UNITED STATES PATENT AND TRADEMARK OFFICE
CERTIFICATE OF CORRECTION

PATENT NO.      : 10,364,012 B2
APPLICATION NO. : 15/443064
DATED           : July 30, 2019
INVENTOR(S)     : Kevin J. Kimball It is certified that error appears in the above-identified patent and that said Letters Patent is hereby corrected as shown below:

In the Specification

Column 1
Line 6, delete the "," after the word "engines".
Line 6, after the word "and", insert a --,--.

Column 3
Line 2, after "one", insert --of the--.

Column 5
Line 11, "is side" should be ---is a side---.
Line 13, "is side" should be ---is a side---.
Line 15, "is side" should be ---is a side---.

Column 6
Line 1, delete the word "directly".

Column 7
Line 62, "of the each" should be ---of each---.

Column 9
Line 20, delete the first occurrence of the word "the".

In the Claims

Column 10
Line 50, "lets" should be ---legs---.

Signed and Sealed this
Fifteenth Day of October, 2019

Andrei Iancu
*Director of the United States Patent and Trademark Office*